M. L. DAVIS.
MEASURING DEVICE.
APPLICATION FILED AUG. 9, 1915.
1,198,622.
Patented Sept. 19, 1916.
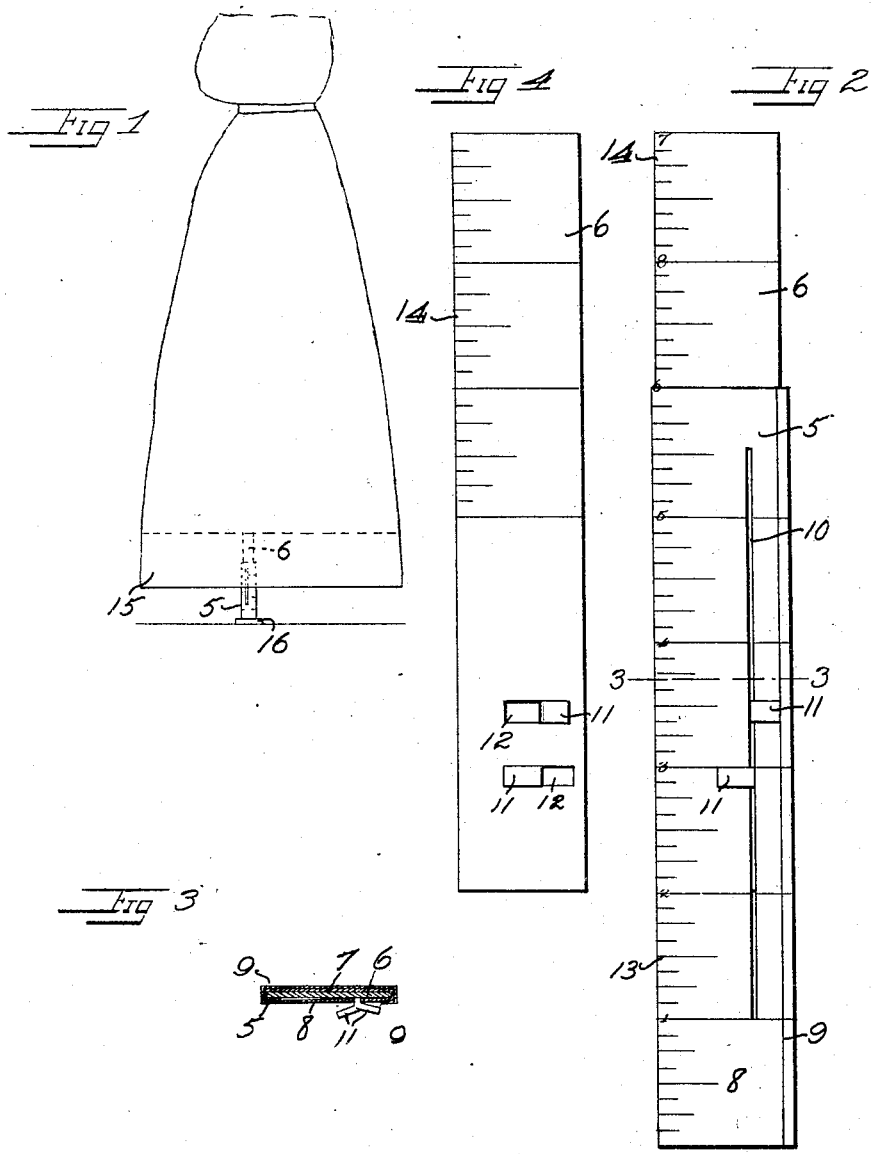
Inventor
Margaret L. Davis
By Geo. P. Kimmel.
Attorney

UNITED STATES PATENT OFFICE.

MARGARET L. DAVIS, OF WAXAHACHIE, TEXAS.

MEASURING DEVICE.

1,198,622.     Specification of Letters Patent.     Patented Sept. 19, 1916.

Application filed August 9, 1915. Serial No. 44,450.

*To all whom it may concern:*

Be it known that I, MARGARET L. DAVIS, a citizen of the United States, residing at 219 Williams street, Waxahachie, in the county of Ellis and State of Texas, have invented certain new and useful Improvements in Measuring Devices, of which the following is a specification.

This invention relates broadly to measuring devices and more specifically to means for gaging the hem of a garment.

As a principal object, it is contemplated by the present invention to produce a measuring device which shall be especially adapted for use in gaging the width of a garment hem and for measuring the distance of the hem above the floor. To attempt the determination of these measurements by the employment of an ordinary rule, or any measuring instrument having a fixed length and devoid of means of marking the scaling edge during the measurement, is a tedious task owing to the fact that two separate points must be laid off upon the garment. The device of this invention includes, accordingly, means for adjustably relating a pair of scales or graduated rules in such manner that the two measurements of the hem width and of the height above the floor may be simply and simultaneously taken.

More specifically, it is an object of this invention to provide a pair of telescoping rules which are equipped with linear graduations oppositely directed, one of the rules being prevented from displacement with respect to the other rule through the medium of means which also act as an indicator with respect to the second rule.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:

Figure 1 is an elevational view showing the manner of employing the hem gage of this invention upon a skirt to measure at once the width of the hem and the height thereof from the ground; Fig. 2 is an enlarged view of the hem gage; Fig. 3 is a transverse sectional view thereof on the line 3—3 of Fig. 2, and Fig. 4 is a view in elevation showing the telescoping rule withdrawn from the gage.

The hem gage of this invention comprises chiefly a casing scale 5 and a telescoping scale 6 slidably associated therewith. The casing scale is formed of any desirable material such as paper, card-board, celluloid or even a light metal and includes side portions 7 and 8 which form a rectangular casing and loosely inclosing the sliding scale 6, the side portion 8 being extended and bent about the side 7 to form a reinforcing portion 9 which, in the event that the device is made of paper or card-board, may be adhesively connected with said side 7 to maintain the rectangular configuration shown.

Extending longitudinally through the side piece 8 of the rule 5 is a slot 10 through which there project lugs 11 which are struck up integrally from the material composing the telescopic rule 6 in the manner denoted by the numeral 12 of Fig. 4. These lugs, subsequent to their projection through the slot 10 are oppositely bent in order to prevent displacement of the sliding scale from within the casing scale. The lugs are also adapted to function as indicators upon the linear graduations 13 with which the casing scale is provided. Similar graduations 14 are provided for the telescoping rule 6 but extend in the opposite direction to the graduations 13.

In use, the zero end of the graduations 13 upon the outer scale 5 is set upon the floor and the scale placed in the vertical position shown in Fig. 1. The sliding scale 6 is then pulled out of the sheath scale 5 until one of the markers 11 indicates the previously determined height of the hem 15 above the floor. The width of the hem may then be read upon the combined scales 5 and 6, using the previously mentioned marker 11 as the zero point. It will be noted that the graduation numeral appearing immediately above the upper edge of the casing rule is the one that must be read for the determination of the extended length of the hem gage. For the purpose of supporting the gage in the position shown in Fig. 1 a removable stand 16 of any suitable description may be employed. If merely the width of a garment hem is to be measured the gage may be held in the operator's hand and the extension rule 6 employed as needed. While in the foregoing, however, there has thus been illustrated in the drawings and described in the specification such combination and arrangement of elements as constitute the preferred embodiment of this invention, it is desired to emphasize the fact that such minor changes in the matters of proportion and degree may be made in later adaptation of this device as shall not alter the spirit of the invention as defined in the appended claims.

What is claimed is:

1. A hem gage including an extension scale, a casing scale slidably inclosing the extension scale, and formed with a slot, and a plurality of oppositely arranged lugs struck up from said extension scale for projection through said slot to serve as retainers and as markers upon said casing scale.

2. A hem gage, in combination with a slidable scale member, a casing therefor formed of sheet of material bent to form parallel spaced side portions, retaining tongues formed on the slidable scale, one of the side portions of said casing having a slot to receive said tongues, the latter acting as markers, the last said side being extended and bent about the opposite side to reinforce the latter and maintain the casing in rectangular form.

3. A hem gage including an extension scale, a casing scale slidably inclosing the extension scale and formed with a slot, and integral lugs struck up from said extension scale for projection through said slot, said lugs being oppositely bent laterally across the slot to prevent disassociation of the scales and being also adapted to serve as markers upon said casing scale.

4. A hem gage including an extension scale, a casing scale slidably sheathing the extension scale and including connected side portions, and a reinforcing portion carried by one of said side portions to embrace the other side portion and adapted to overlappingly fasten upon the first said side piece, the latter having a longitudinal slot therein and being provided with linear graduations, oppositely directed graduations provided for the extension scale, and lugs formed integrally with said extension scale for projection through said slot.

In testimony whereof I affix my signature hereto.

MARGARET L. DAVIS.

Copies of this patent may be obtained for five cents each, by addressing the "Commissioner of Patents, Washington, D. C."